United States Patent [19]

Schatz

[11] Patent Number: 5,143,701
[45] Date of Patent: Sep. 1, 1992

[54] METHOD AND AN APPARATUS FOR THE TREATMENT OF EXHAUST GAS FROM IC ENGINES

[76] Inventor: Oskar Schatz, Waldpromenade 16, D-8035 Gauting, Fed. Rep. of Germany

[21] Appl. No.: 535,475

[22] Filed: Jun. 8, 1990

[51] Int. Cl.$^5$ .................... F01N 3/18; F01N 3/28
[52] U.S. Cl. .................... 422/177; 422/115; 422/196; 422/211; 60/299; 60/301; 55/DIG. 30
[58] Field of Search .......... 422/177, 211, 115, 196; 60/299, 301; 55/DIG. 30

[56] References Cited

U.S. PATENT DOCUMENTS

| | | | |
|---|---|---|---|
| 3,066,477 | 12/1962 | Houndry | 422/177 X |
| 3,086,839 | 4/1963 | Bloch | 422/177 X |
| 3,645,098 | 2/1972 | Templin et al. | 422/177 X |
| 3,712,030 | 1/1973 | Priest | 55/DIG. 30 |
| 3,751,917 | 8/1973 | Garcea | 422/177 X |
| 3,758,278 | 9/1973 | Weber | 422/177 X |
| 3,957,444 | 5/1976 | Goto et al. | 422/177 X |
| 3,961,478 | 6/1976 | Lange | 422/177 X |
| 3,963,447 | 6/1976 | Hayashi | 422/177 X |
| 5,016,438 | 5/1991 | Harris | 60/299 |

Primary Examiner—Lynn M. Kummert
Attorney, Agent, or Firm—Harness, Dickey & Pierce

[57] ABSTRACT

For the treatment of exhaust gases, more particularly the catalytic treatment of exhaust gases from IC engines, and more especially the exhaust gases of an automobile, the exhaust gases are passed through a preconverter associated with a main converter and designed for cold start conditions, as long as the engine is in a first operating condition thereof, in which the exhaust gas temperature is not sufficient to activate the main converter. As soon as a second operating state is attained, in which the exhaust gas temperature activates the main converter, the exhaust gases are passed in parallel via the preconverter and the main converter.

17 Claims, 1 Drawing Sheet

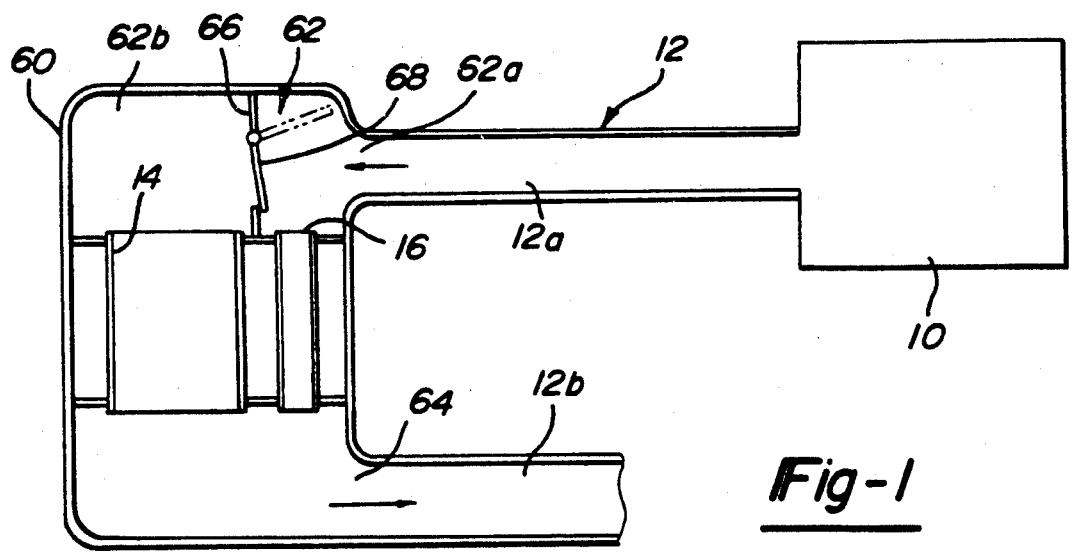
Fig-1
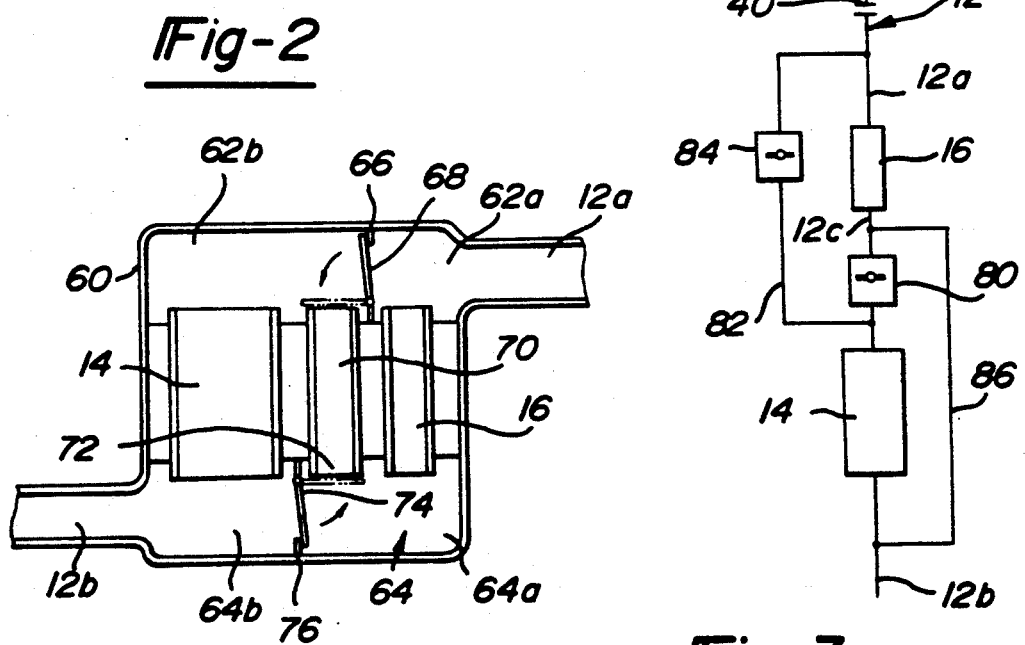
Fig-2
Fig-3

METHOD AND AN APPARATUS FOR THE TREATMENT OF EXHAUST GAS FROM IC ENGINES

BACKGROUND OF THE INVENTION

The invention relates to a method for the treatment, and more particularly the catalytic treatment of the exhaust gases of IC engines such as automobile engines, in which the gases resulting from combustion are passed through a preconverter associated with a main converter and designed for starting from cold as long as the engine is in a first operational condition, in which the temperature of the exhaust gases is insufficient to activate the main converter. The invention also relates to an apparatus for performing the method.

When an IC engine is started from cold large amounts of pollutants are produced. It is known practice to reduce the emission of pollutants by using a converter placed downstream from the exhaust gas outlet of the engine, the commonest form of such converter used with gasoline engines being the catalytic converter. Furthermore converters are used with diesel engines in order for instance to reduce the amount of CO, unburned hydrocarbons, and/or soot or other solid particles in the exhaust gas. The object of the invention will be more especially explained with reference to exhaust gas catalytic converters for gasoline engines, although however in effect there are similar problems to be coped with in connection with other converters for the processing of exhaust gases from any other IC engines.

Converters call for a certain minimum temperature of the reactants supplied to them in order to develop their action. In the time expiring before such minimum temperature is attained the pollutants are let off into the environment without any conversion.

Conventional three way catalytic converters contain catalytic material for the oxidation of CO and unburned hydrocarbons and also material for the reduction of $NO_x$. Owing to the time lag in the activation of the catalytic converter before the operational temperature is reached, pollutants such as more especially CO and unburned hydrocarbons are affected, i.e. not converted, while substantial emission of $NO_x$ only takes place when conventional operating temperatures are reached.

In order to reduce this lag in the commencement of the reaction in the catalytic converter many possibilities have been considered, at least in theory, as for instance the electrical heating of the exhaust gases prior to the entry thereof into the catalytic converter, the additional heating of the catalytic converter, or keeping the catalytic converter heated up by thermal insulation.

In the case of electrical heating of the exhaust gases of the catalytic converter, the battery or generator installed regularly in automobiles is unable to supply the heavy amperage required without expensive modification.

Keeping catalytic converters hot by the thermal insulation involves the problem of overheating, more especially during operation under full load.

In order to reduce the response time of the catalytic converter there has already been a proposal to provide a small preconverter designed for the cold start condition and placed on the inlet side of the main catalytic converter adjacent to the engine so that when the exhaust gas temperature sufficient for the operation of the main catalytic converter is reached the preconverter may be disconnected by the use of bypass so that the exhaust gases pass directly to the main catalytic converter, which is further removed from the engine, in order to avoid excessive thermal effects thereon.

This arrangement involves a complex and expensive structure and there is more especially the disadvantage that in addition to the expensive catalyst-coated surface in the main catalytic converter necessary for catalytic operation there is the need for a further catalyst coated surface, i.e. in the preconverter. This has not become accepted so that at the present time when a preconverter is used the exhaust gas is at all times passed through both the preconverter and the main catalytic converter. Owing to the smaller volume this catalytic preconverter is to heat up more rapidly and thus develop its eliminating action on pollutants even before the main catalytic converter. However, it causes undesired side effects, more especially in the form of a loss in pressure with effects on the engine under full power.

SUMMARY OF THE PRESENT INVENTION

Accordingly one object of the invention is to provide a method and an apparatus of the initially mentioned type which is so designed that the advantage of having a preconverter is able to be utilized without undesired side effects.

A still further object of the invention is to provide such a method and apparatus which take into account the requirements of economic production.

A still further aim of the invention is to ensure that the expense of providing the catalytic coating for a main catalytic converter is not exceeded.

Yet another objective of the invention is to keep the amount of space required by the system as low as possible.

In order to achieve these or other objects appearing from the present specification, claims and drawing, in the present invention the exhaust gases are passed in parallel through the preconverter and the main converter as soon as a second operational state is achieved in which the operating temperature of the main converter is reached, that is to say, at which temperature operation of the main converter becomes possible.

As a result of this for the operational state with an exhaust gas temperature insufficient for the main converter it is possible to provide a preconverter which is designed for low mass flows, without the disadvantage that during operation of the IC engine at a high power level and/or high speeds of rotation the low flow cross section of the preconverter leads to the drawback of a high resistance to pressure on the exhaust gas flow, because in this case the flow cross section of the main converter and of the preconverter are used by the exhaust gas. Furthermore the size of the catalyst-coated surface of the main converter may be reduced by an amount equal to the size of the acting surface of the preconverter connected in parallel to the main catalytic converter. Owing to there no longer being a bypass duct and to the possibility of accommodating the preconverter and the main converter in a common housing, there is the benefit of a very simple, compact and economically produced design.

In accordance with a simple form of the present invention in the first operational state the exhaust gases are passed through the preconverter, the main converter being bypassed.

In accordance with another expedient form of the invention in the first operational state the exhaust gases are passed firstly through the preconverter and then through the main one so that the main converter is heated up at a particularly high rate to the required operating temperature.

A further possible design in accordance with the invention is such that there is a catalytic conversion in the preconverter and the main converter, a further development being possible as well in accordance with which the catalytically active material is added to the exhaust gas flowing through the converter.

Conventionally gasoline and diesel engines are started with an excess of fuel. During the starting up phase there is thus a danger of catalytic oxidation of CO and unburned hydrocarbons being incomplete or not taking place at all, because the air fraction is not sufficient. It is thus an advantage if in accordance with a further possible feature of the invention secondary air is added in a known manner to the exhaust gases prior to the entry thereof into the converters.

In accordance with a particularly advantageous form of the invention the preconverter is heated with waste heat from the engine.

An apparatus with an IC engine and with a main converter placed on the exhaust gas duct thereof so as to be associated with a preconverter designed for the cold start condition, is developed in accordance with the invention in such a manner that the exhaust gas duct has two parallel limbs, of which a first limb defines a flow path through the preconverter and the second limb defines a flow path through the main converter and the two limbs are provided with a setting device which switches the exhaust gas flow selectively either through the first limb or through both of the limbs.

A further development of the invention is possible in which the exhaust gas duct has a first section placed upstream from the converters and a second section placed downstream from the converters, and furthermore a first limb adjoining this first section and leading the flow through the preconverter and a second limb leading the flow through the main converter, and furthermore a setting device, which it a first position thereof places the first and the second limbs in series between the first and the second section, while it is second position it places the first and the second limbs in parallel between the first and the second sections.

In accordance with a convenient development of the invention the first limb and the second limb and a connecting duct are arranged in a common housing respectively between an intake chamber connected with the first section and an outlet chamber connected with the section and in a first setting the setting device separates a part, connected with the first section, of the intake chamber, from a part connected with the second limb and the connection duct and separates a part, connected with the first limb and the connecting duct, of the outlet chamber from a part, connected with the second limb and the second section, of the outlet chamber, while in its second section it overrides the separating effect between the two parts of the intake chamber and the two parts of the outlet chamber and shuts down the connecting duct.

A still further form of the invention is possible in which the setting device—which is able to be reset between two terminal settings—comprises a first flap in the intake chamber and a second flap in the outlet chamber, which in the one position separate the chambers in the respective parts, and in the other position at least one of the flaps covers the connecting duct, and preferably the two flaps are connected together for ganged motion.

Another advantageous development of the invention is possible in which the exhaust gas duct has a first section placed upstream from the preconverter, a second section placed downstream from the main converter and a connecting section placed between the preconverter and the main converter, which is able to be interrupted by a first valve device, and parallel to the preconverter there is a first bypass duct which extends from the first section, is able to be interrupted by a second valve device, which opens into the connecting section between the first valve device and the main catalytic converter and parallel to the main catalytic converter there is a second bypass duct which extends from the connection section between the preconverter and the first valve device and which opens into the second section, the two valve devices preferably being ganged for simultaneous operation.

In accordance with a further convenient development of the invention the preconverter is constituted by a heat storage means. The heat storage means may be charged by the waste heat from the engine without additional expenditure of energy.

In accordance with another development the converters may be catalytic converters.

Another expedient development of the invention is possible in which at a point upstream from the converters the exhaust gas duct is provided with a connection, able to be turned on and off, for secondary air.

Taking the conventional manner of operation of automobiles into account it is convenient to design the heat storage means for high efficiency at low speeds of rotation and low loads of the engine.

Some embodiments of the invention will now be described in detail with reference to the drawing.

BRIEF DESCRIPTION OF THE DRAWINGS

FIG. 1 is a diagrammatic view of the exhaust gas system of an automobile IC engine with a preconverter and a main converter.

FIG. 2 shows another embodiment of such an exhaust gas system.

FIG. 3 shows a third embodiment of the present invention as a duct circuit diagram.

DETAILED DESCRIPTION OF THE PREFERRED EMBODIMENTS

In the working embodiment of the invention in shown in FIG. 1 the exhaust gases produced by an IC engine are led off via an exhaust gas duct 12, whose section 12a connected with the engine 10 is connected with a catalytic converter housing 60. In this catalytic converter housing 60 there is an intake chamber 62 and an outlet chamber 64, between which the catalytic converters (which are only indicated diagrammatically) that is to say the catalytic preconverter 16 and the main catalytic converter 14 are arranged. The catalytic preconverter 16 is arranged in the intake chamber 62 adjacent to the intake of the exhaust gas duct 12. Between the catalytic preconverter 16 and the main catalytic converter 14 the intake chamber 62 is divided up by a partition 66 into two parts 62a and 62b, the partition being in part formed by a pivoting flap 68 or door in order to connect together or to separate the two sections 62a and 62b of the intake chamber.

When starting up from cold the flap 68 is shut so that the exhaust gas only flows through the catalytic preconverter 16. As soon as the switch-over condition is complied with the flap 68 is pivoted into its opened position as indicated in broken lines so that the exhaust gas is able to flow at once via the catalytic preconverter 16 and the main catalytic converter 14. Thus there is no substantial pressure resistance caused by the catalytic preconverter. Although in this design the catalytic preconverter is constantly swept by the exhaust gas, here as well the catalytic preconverter 16 may be designed for the conditions obtaining when starting up from cold and the main catalytic converter may be designed for conditions occurring when the engine is producing a large amount of power and running at high speeds.

Since the switch over of the flap 68 only takes place when the temperature of the exhaust gas has reached a value which is high enough for the operation of the main catalytic converter 14 and previous to this the main catalytic converter is swept by the hot exhaust gas from the outlet chamber 64, the main catalytic converter is able to start operation with practically no delay when the flap 68 is switched over.

If the heating of the main catalytic converter should require additional heat, it is possible—as shown in FIG. 2—for the exhaust gas leaving the catalytic preconverter to be passed via the main catalytic converter into the section 12b, placed downstream from the housing 60, of the exhaust gas duct 12. For this purpose a connecting duct 70 is placed in the housing 60 in parallel to the catalytic preconverter 16 and the main catalytic converter 14 between the latter so as to connect the intake chamber 62 and the outlet chamber 64, the outlet 72 of the duct 70 having associated with it a further flap 74 (which is ganged so as to move jointly with the flap 68) in such a manner that in its one setting, when the flap 68 is open, it covers over the outlet 72 and in its other setting shuts a partition 76 which is arranged in the outlet chamber 64 between the connecting duct 70 and the main catalytic converter 14.

If the flap 68 is closed, the partition 76 will also be shut and the connecting duct 70 will be free so that the exhaust gas is firstly passed out of the part 62a, connected with the exhaust gas duct 12, of the intake chamber 62 through the catalytic preconverter 16 and then passed out of the part 64a, which is connected with the catalytic preconverter 16 and the connecting duct 70, of the outlet chamber 64 through the connecting duct 70 back to the part 62b, which is separated by the flap 68 and is connected with the main catalytic converter 14, of the intake chamber 62 and then via the main catalytic converter 14 into the other part 64b of the outlet chamber 64 and thence into the section 12b of the exhaust gas duct 12.

If the flaps 68 and 74 are jointly switched over, the exhaust gas will flow from the intake chamber 62 straightway via the main catalytic converter 14 and the catalytic preconverter 16 into the outlet chamber 64, whereas the path via the connecting duct 70 is shut off by the flap 74.

As a departure from the arrangement of FIG. 1, the flap 68 is so pivoted that together with the flap 74 it is able to cover over the connecting duct 70.

If in applications where space is at a premium the accommodation of a housing enclosing within it an intake chamber, an outlet chamber, a main catalytic converter, a catalytic preconverter and a connecting duct, should give rise to inconvenience, the system in accordance with FIG. 2 may be replaced by a system in accordance with FIG. 3, in which the catalytic preconverter and the main catalytic converter are separated from each other in space and for instance may be arranged one after the other in the longitudinal direction of the vehicle under the floor thereof.

In FIG. 3 the first section 12a of the exhaust gas duct 12 coming from the engine 10 leads to the catalytic preconverter 16, which is connected by a connecting section 12c with the main catalytic converter 14, which is adjoined on the downstream side by the second section 12b of the exhaust gas duct 12. The connecting section 12c comprises a first valve device (80), by which the connection between the catalytic preconverter 16 and the main catalytic converter 14 may be interrupted in the direction of flow of the exhaust gas.

A first bypass duct 82 is arranged in parallel to the catalytic preconverter 16 and it extends from the first section 12a of the exhaust gas duct between the first valve device 80 and the main catalytic converter 14 into the connecting section 12c and contains a second valve device 84. A second bypass duct 86 branches off between the catalytic preconverter 16 and the first valve device 80 from the connecting section 12c and shunts the main catalytic converter 14, downstream from which it opens into the second section 12b of the exhaust gas duct.

During a cold start phase the first valve device 80 is opened and the second valve device 84 is shut so that the exhaust gas emerging from the catalytic preconverter 16 is able to flow both through the main catalytic converter 14 and also through the second bypass duct 86 to the second section 12b of the exhaust gas duct. Since in this phase of operation the main catalytic converter 14 is not yet effective, it is not necessary to cause the entire exhaust gas flow through the main catalytic converter 14. The part of the flow through the main catalytic converter 14 is sufficient to heat up the main catalytic converter 14 to the temperature needed for operation thereof.

As soon as the temperature required for the operation of the main catalytic converter 14 has been reached thereat, the first valve device 80 is shut and the second valve device 84 is opened so that the exhaust gas has two parallel flow paths running on the one hand via the catalytic preconverter 16 and on the other hand via the main catalytic converter 14, such paths branching at the opening of the first bypass duct 82 from the first section 12a of the exhaust gas duct and coming together again at the opening of the second bypass duct 86 into the second section 12b. The exhaust gas duct 12 is provided with a connection 40 for secondary air upstream from the preconverter 16.

I claim:

1. A method for treating exhaust gases of internal combustion engines comprising:
   providing a catalytic converter coupled with an exhaust conduit from the internal combustion engine, said catalytic converter including a housing with a preconverter and a main converter positioned in parallel with respect to one another, and means for directing flow of exhaust gases through said preconverter and main converter, said flow directing means positioned within said housing;
   passing exhaust gases into said converter housing;
   positioning said flow directing means in said housing in a first position such that said exhaust flow passes only through said preconverter;

heating said main converter with said exhaust gases passing through said preconverter to a predetermined temperature;

moving said flow directing means to a second position in said housing after said main converter is heated to said predetermined temperature such that said exhaust flow passes through said preconverter and said main converter; and exiting said exhaust gas from said housing.

2. The method as claimed in claim 1, wherein the first operational condition includes passing the exhaust gases through the preconverter and bypassing the main converter.

3. The method as claimed in claim 1, wherein the first operational condition includes passing the exhaust gases through the preconverter and then through the main converter.

4. The method as in claim 1, further comprising providing a catalytic transformation in the preconverter and in the main converter.

5. The method as claimed in claim 4, further comprising adding catalytically active material to the exhaust gas flowing through the converters.

6. The method as in claim 1, further comprising adding secondary air to the exhaust gases prior to entry thereof into the converters.

7. The method as in claim 1, further comprising heating the preconverter with waste heat from the engine.

8. An apparatus for treating exhaust gases of internal combustion engines comprising:

an exhaust gas duct having an upstream end and a downstream end, with a first section placed at the upstream end and a second section placed at the downstream end;

wherein a preconverter is connected to the first section and a main converter is connected to the second section, and a connection section is placed therebetween to connect the preconverter to the main converter for flow therethrough;

a first valve device positioned in said connection section;

a first bypass duct arranged parallel to said preconverter connecting said first section to said connection section at a point between said first valve device and said main converter;

a second valve device positioned in said first bypass duct;

a second bypass duct arranged parallel to said main converter connecting said connection section at a point between said preconverter and said first valve device to the second section;

wherein said first and second valve devices in a first position provide a flow path through said preconverter, and in a second position provide flow paths through said preconverter and through said main converter.

9. The apparatus as claimed in claim 8, wherein said first and second valve devices are ganged so as to be jointly operated.

10. The apparatus as in claim 8, wherein said preconverter is constructed and arranged as a heat storage means.

11. The apparatus as claimed in claim 10, wherein said heat storage means is constructed and arranged for high efficiency at low speeds of rotation and low loads of the IC engine.

12. The apparatus as in claim 8, wherein said converters are catalytic converters.

13. The apparatus as in claim 8, wherein said exhaust gas duct is provided with a connection for secondary air in said first section.

14. An apparatus for treating exhaust gases of internal combustion engines comprising:

a converter coupled with an exhaust conduit from the internal combustion engine, said converter including a housing with a preconverter and a main converter positioned in parallel with respect to one another within said housing;

first means for directing flow of exhaust gases through said preconverter and main converter, said first flow directing means positioned within said housing;

said first flow directing means being movable between a first and second position, wherein in said first position, exhaust gas flow is directed through said preconverter and after said main converter reaches a predetermined temperature, said first flow directing means moves to said second position in said housing, wherein exhaust gas flow is directed through said preconverter and main converter.

15. The apparatus according to claim 14 further comprising:

connecting means for providing flow from said preconverter through said main converter such that exhaust gas flow is directed in series through said preconverter and main converter, and second flow directing means coupled with said first flow directing means, said second flow directing means in a first position providing series flow and in a second position prohibiting flow through said connecting means once said main converter reaches a predetermined temperature such that exhaust flow is directed in parallel through said preconverter and main converter.

16. The apparatus as claimed in claim 15, wherein said first and second flow directing means, each of which may be switched between two positions, comprises a first flap in an intake chamber and a second flap in an outlet chamber, which in one position separate the chambers into two parts and in the other position at least one of the flaps covers the connecting means.

17. The apparatus as claimed in claim 16, wherein the two flaps are ganged for moving jointly.

* * * * *